United States Patent [19]

Erickson

[11] Patent Number: 4,767,233
[45] Date of Patent: Aug. 30, 1988

[54] IMPELLER MOUNTING APPARATUS
[75] Inventor: John W. Erickson, Huntington Beach, Calif.
[73] Assignee: Dresser Industries, Inc., Dallas, Tex.
[21] Appl. No.: 28,358
[22] Filed: Mar. 20, 1987
[51] Int. Cl.⁴ .............................................. B25G 3/00
[52] U.S. Cl. .................................. 403/318; 403/355; 403/378
[58] Field of Search ............. 403/355, 378, 379, 318, 403/316

[56] References Cited

U.S. PATENT DOCUMENTS

| | | | |
|---|---|---|---|
| 1,949,678 | 3/1934 | Doran | 403/378 |
| 2,291,346 | 6/1942 | Robinson | 103/87 |
| 2,326,317 | 8/1943 | Amtsberg | 403/318 |
| 2,798,438 | 7/1957 | Greathouse | 103/112 |
| 3,830,577 | 1/1974 | Rampe et al. | 403/378 |
| 4,224,462 | 12/1980 | Ottestad | 188/67 |

FOREIGN PATENT DOCUMENTS 407098  11/1973  U.S.S.R. .................. 403/318

Primary Examiner—Andrew V. Kundrat
Attorney, Agent, or Firm—Roy L. Van Winkle

[57] ABSTRACT

The impeller mounting apparatus includes one or more pins extending through the hub into the shaft with the pins being retained in the holes by means of a resilient metallic band of continuous construction which is forced onto the hub into grooves or recesses which prevent the dislodgement of the band and the inadvertent loosening of the impeller on the shaft.

4 Claims, 1 Drawing Sheet

IMPELLER MOUNTING APPARATUS

BACKGROUND OF THE INVENTION

This invention relates generally to improved apparatus for mounting impellers on rotating shafts. More specifically, but not by way of limitation, this invention relates to an improved apparatus for mounting an impeller wherein pins extend through the impeller hub into the rotating shaft and are held in position therein by a resilient metallic band.

Various apparatus have been devised in the past for mounting gears, impellers, and the like on rotating shafts. Such apparatus have included splined interconnections, keys located in mating keyways cut into both parts, set screws located in the impeller hub extending into frictional engagement with the shaft, and collet type connections providing a frictional interface therebetween. Other apparatus have included extending screws or bolts through the shaft and hub and some have included the positioning of a pin that extends through the hub into the shaft and is held in position therein by various devices.

U.S. Pat. No. 3,830,577 issued Aug. 20, 1974 to Rampe et al illustrates the use of a pin connection fastening a gear to a shaft. The pin is held in place by a deformable band that encircles the hub and encompasses the pin. Each of the aforementioned methods of attaching impellers or gears and the like to rotating shafts has been successfully used, but each has limitations which restrict their use. For example, the splined interconnections are extremely expensive and can be used only where a solid shaft is utilized, keyways are expensive and unless two are provided, are inherently unbalanced, and thus cannot be used on high speed equipment, and deformable bands such as that shown in the Rampe patent mentioned above are also inherently in balanced.

An object of this invention is to provide a simple and inexpensive means for attaching an impeller to a shaft that may be inherently balanced and that may be utilized even with thin wall shafts.

SUMMARY OF THE INVENTION

This invention then provides an impeller mounting means for positioning an impeller having a hub portion on a rotating shaft for rotation therewith. The mounting means comprises at least one radially oriented pin that extends through the hub portion into the shaft and a generally circular, continuous band encircling the hub portion radially outwardly of the pin in engagement with the pin for retaining the pin and engaging the hub portion for retaining the band on the hub portion. The band has an inside dimension smaller than an outside dimension of the hub portion so that the band must be forced into position on the hub portion.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figures 1, 2:
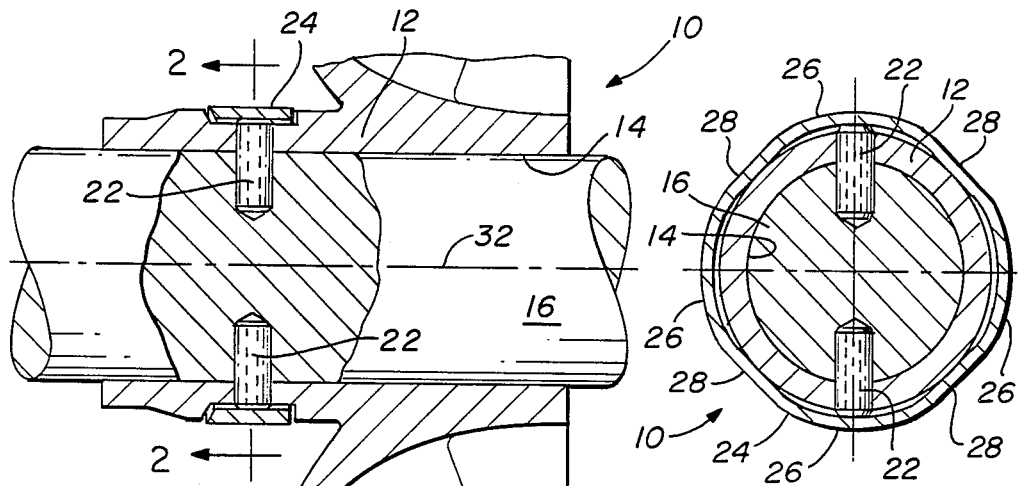
FIG. 1 is a fragmentary cross-sectional view of an impeller that is mounted on a shaft by apparatus constructed in accordance with the invention.
FIG. 2 is a transverse cross-sectional view taken generally along the line 2—2 of FIG. 1.
Figure 3:
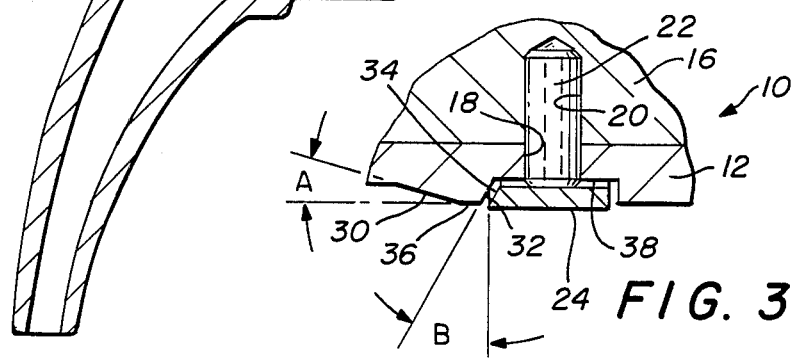
FIG. 3 is an enlarged fragmentary cross-sectional view of a portion of the apparatus of FIG. 3 indicated by the line 3—3.

Referring to the drawing and to FIGS. 1, 2 and 3 in particular, shown therein and generally designated by the reference character 10 is an impeller that includes a generally cylindrical hub portion 12. The impeller 10 includes a bore 14 for receiving a rotating shaft 16.

Holes 18 extend through the hub 12 and are aligned with holes 20 drilled into the shaft 16. Mounting pins 22 are located in the holes to prevent rotation of the impeller 10 relative to the shaft 16. A continuous band 24 of generally circular configuration encircles the hub 12 in engagement with the pins 22 to prevent the pins from coming out of the aligned holes 18 and 20 in the hub 12 and shaft 16, respectively.

As shown most clearly in FIG. 2, the band 24 includes a plurality of lobes 26 separated by a plurality of relatively flat portions 28. The flat portions 28 are in engagement with the exterior of the hub 12. The band 24 is preferably constructed from a material such as spring steel so that it will be resilient. Adequate strength must be provided in the band 24 so that centrifugal force developed during high speed rotation will not deform the band 24 and permit the pins 22 to be dislodged.

Referring to FIG. 3, it will be seen therein that the hub 12 is provided with a sloping surface 30 that is disposed at an angle A relative to the centerline 32 of the impeller 10. A second sloping surface 32 on the hub 12 is disposed at an angle B relative to the centerline of the impeller 10 and is at a much greater angle than the angle A for reasons that will be discussed hereinafter.

As may also be seen in FIG. 3, one edge of the band 24 is provided with a beveled surface 34 that is at substantially the same angle as the angle B. It should be noted that the sloping surfaces 30 and 32 form on the hub 12 an outer peripheral surface 36 that has a diameter greater than the smallest inside dimension of the band 24. That dimension would extend from one of the flats 28 diametrically across the apparatus to the opposing flat 28. The result of such an arrangement is that an annular recess 38 is formed in the exterior of the hub 12 for receiving the band 24.

To utilize the apparatus of the invention, the impeller 10 is placed over the shaft 16 until the holes 18 and 20 in the hub and shaft 16, respectively, are in alignment. The pins 22 are then inserted into the holes. The band 24 is placed onto the hub portion 12 until the edge thereof engages the sloping surface 30. Force applied to the band 24 increases the diameter of the band 24 as it slides along the surface 30 until it moves past the surface 36 into the annular recess 38. When the band reaches the position over the recess 38, the resiliency of the material forming the band 24 causes it to move into the recess 38 as illustrated in FIGS. 1 and 3.

Should it be necessary to remove the impeller 10 from the shaft 16, the reverse of the foregoing procedure can be utilized. That is, the band 24 can be forced relatively toward the left as illustrated in FIG. 1 so that the surfaces 32 and 34 come into engagement camming the band 24 relatively outwardly and enlarging its diameter until it is of sufficient size to pass over the surface 36 of the hub 12. When this is accomplished, the pins 22 can be removed and the impeller 10 removed from the shaft 16.

The slope A of surface 30 being at a relatively flat angle permits the installation of the band 24 on the hub 12 with much less force than is required when removing the band 24 past the slop B of surface 32 when removing the band. It should also be pointed out that a circular band 24 could be utilized in lieu of the configuration illustrated, but considerably more force would be required to deform the band in installing or removing the band in accordance with the foregoing description.

DETAILED DESCRIPTION OF THE EMBODIMENTS OF FIGS. 4 AND 5

Figures 4, 5:
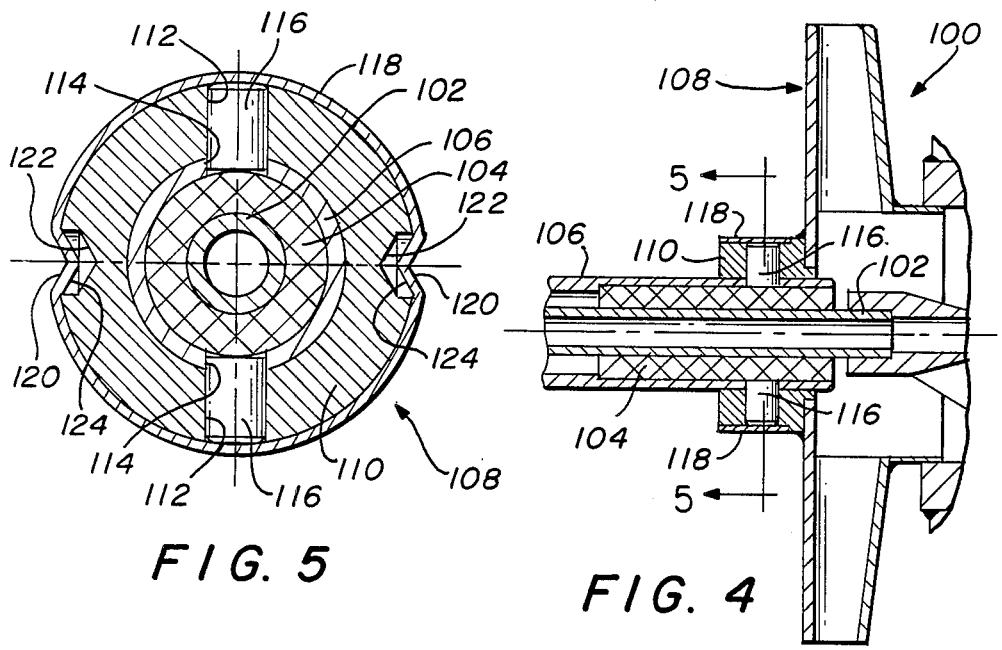
FIG. 4 is a fragmentary cross-sectional view of another type of impeller and shaft arrangement wherein the impeller is held on the shaft by another impeller mounting apparatus that is also constructed in accordance with the invention.
FIG. 5 is a transverse cross-sectional view of the apparatus of FIG. 4 taken generally along the line 5—5 of FIG. 4.

Referring now to FIGS. 4 and 5, shown therein and generally designated by the reference character 100 is a portion of a canned motor pump including a fixed post 102 that extends concentric with the axial centerline of the pump 100. A bearing or bushing 104 encircles the post 102, a hollow, tubular shaft 106 encircles the bushing 104, and a rotor 108 is attached to the hollow shaft 106. Although not shown, it will be understood that the other end of the post 102 and shaft 106 will include a bearing or bushing 104 also.

The impeller 108 includes a hub portion 110 having diametrically opposed holes 112 drilled therein that are arranged to be aligned with holes 114 drilled through the shaft 106. Pins 116 are located in the aligned holes 112 and 114. The pins 116 are retained in the holes by a band 118 that is of generally circular configuration and encircles the hub 110.

The band 118 is retained on the hub 110 by inwardly projecting embossments 120 that are disposed on diametrically opposite sides of the band 118 and arranged at about 90° relative to the location of the pins 116. The embossments 120 retain the band 118 on the hub 110 since the embossments 120 are disposed in recesses 124, 122 that are formed in the outer surface of the hub 110.

As shown most clearly in FIG. 5, the band 118 relatively closely fits the exterior of the hub 110 and includes a dimension between the embossments 120 that is of a smaller diameter than the exterior diameter of the hub 110. Accordingly, to install the band 118, it is necessary to force the band 118 onto the hub 110 until the embossments 120 drop into the recesses 122. When in this position, the band 118 cannot be accidentally discharged from the hub 110, and thus remains in position retaining the pins 116 locking the impeller 108 onto the shaft 106.

As can be seen in FIG. 5, the embossments 120 provide sloping surfaces 124 on the embossments 120 that provide a camming effect to stretch or enlarge the resilient, metallic band 118 to reduce the force required for installing and removing the band 118 from the hub 110.

If it is desired to remove the impeller 108 from the shaft 106, the band 118 is pried off the hub portion 110 in the reverse direction compared to the installation. The pins 116 are removed therefrom freeing the impeller 108.

It should be recognized that either hub configuration could be used on either impeller and further that the configuration illustrated in FIGS. 4 and 5 could be used with the solid shaft illustrated in FIGS. 1-3. Similarly, the band and hub configuration illustrated in FIGS. 1-3 could be utilized with the hollow shaft 106 illustrated in FIGS. 4 and 5.

From the foregoing detailed description, it should be apparent that there are provided means for locking or retaining impellers on shafts that will be effective whether or not the shaft is solid or hollow and relatively thin-walled as illustrated in FIGS. 4 and 5. Also, the impellers can be readily removed when desired, yet they can be balanced to eliminate vibrations when used in high speed rotating machinery without the danger of dislodging the pins due to centrifugal force. Also, the mounting means can be relatively inexpensively manufactured since there are no threads or keyways that must be cut. The hub arrangement illustrated in FIG. 1 can be formed by turning on a lathe while the impeller is being finished. Similarly, the hub configuration of FIGS. 4 and 5 can be turned with the holes very easily drilled thereafter during the manufacturing operation. Thus, there is provided a relatively simple, easy and inexpensive apparatus for effectively locking an impeller on a shaft.

It will also be understood that the foregoing detailed description of the two embodiments is presented by way of example only and that there are many changes and modifications that can be made thereto without departing from the spirit or scope of the invention.

What is claimed is:

1. Impeller mounting means for positioning an impeller having a hub portion on a rotating shaft for rotation therewith, said mounting means:
    at least one radially oriented pin extending through said hub portion into said shaft;
    a generally circular, continuous, resilent band of metallic material encircling said hub portion radially outwardly of said pin in engagement with said pin for retaining said pin in said hub portion and shaft and engaging said hub portion for retaining said band on said hub portion, said band having an inside dimension smaller than an outside dimension of said hub portion;
    a second radially oriented pin extending through said hub portion into said shaft, said second pin being diametrically opposite to said first mentioned pin;
    a recess in said hub portion having an outer dimension less than the inside dimension of said band; and,
    surface means including a radially inwardly projecting embossment on said band having sloping sides engageable with said hub portion for increasing the inside dimension of said band when being installed on said hub portion whereby said inside dimension is positioned in said recess.

2. The impeller mounting means of claim 1 and also including:
    a second embossment diametrically opposite said first embossment and at about 90° relative to said pins; and,
    a second recess in said hub portion for receiving said second embossment.

3. Impeller mounting means for positioning an impeller having a hub portion on a rotating shaft for rotation therewith, said mounting means:
- at least one radially oriented pin extending through said hub portion into said shaft;
- a generally circular, continuous, resilent band of metallic material encircling said hub portion radially outwardly of said pin in engagement with said pin for retaining said pin in said hub portion and shaft and engaging said hub portion for retaining said band on said hub portion, said band having an inside dimension smaller than an outside dimension of said hub portion;
- a second radially oriented pin extending through said hub portion into said shaft, said second pin being diametrically opposite to said first mentioned pin;
- an annular recess in said hub portion having an outer dimension less than the inside dimension of said band; and,
- surface means for increasing the inside dimension of said band when being installed on said hub portion whereby said inside dimension is positioned in said recess, said surface means includes first and second annular sloping surfaces on said hub portion engageable with said band, said second annular sloping surface being at a large angle relative to the axial center line of the impeller for enlarging said band when the band is to be removed permitting removal of the pins and removal of the impeller from the shaft.

4. Impeller mounting means for positioning an impeller having a hub portion on a rotating shaft for rotation therewith, said mounting means:
- at least one radially oriented pin extending through said hub portion into said shaft;
- a generally circular, continuous, resilent band of metallic material encircling said hub portion radially outwardly of said pin in engagement with said pin in said hub portion and shaft and engaging said hub portion for retaining said band on said hub portion, said band having an inside dimension smaller than an outside dimension of said hub portion;
- a second radially oriented pin extending through said hub portion into said shaft, said second pin being diametrically opposite to said first mentioned pin;
- an annular recess in said hub portion having an outer dimension less than the inside dimension of said band;
- surface means for increasing the inside dimension of said band when being installed on said hub portion whereby said inside dimension is positioned in said recess, said surface means includes an annular sloping surface on said hup portion engageable with said band; and,
- said band includes at least one pair of diametrically opposed lobes and a pair of diametrically opposed flats between said lobes, said lobes having a diametric dimension therebetween greater than the diameter of said annular recess.

* * * * *